Nov. 8, 1960  H. J. TROCHE  2,959,398
EARTH-BORING APPARATUS
Filed Aug. 15, 1956  6 Sheets-Sheet 1
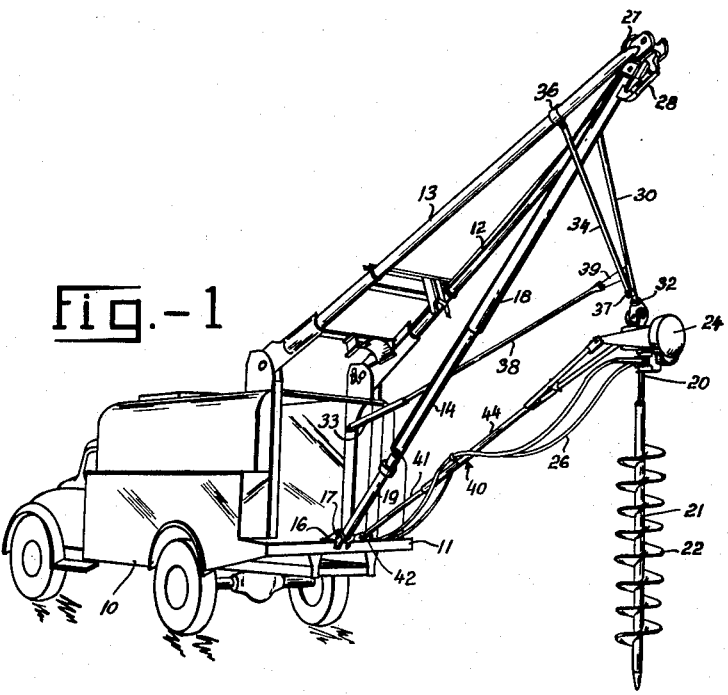
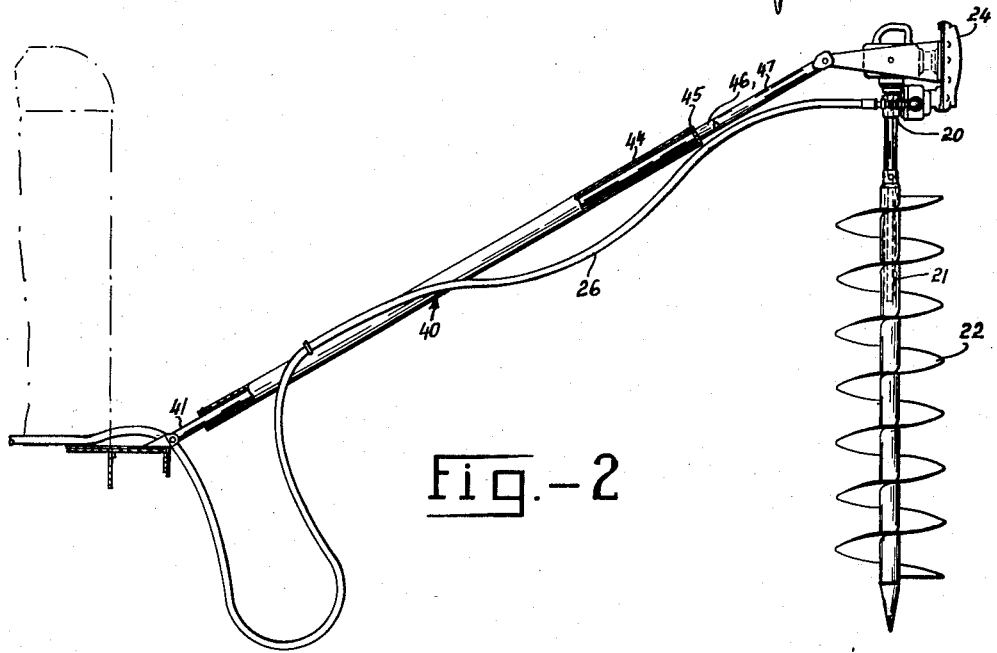
INVENTOR.
HERMAN J. TROCHE
BY
Bates, Teare & McBean
ATTORNEYS Nov. 8, 1960  H. J. TROCHE  2,959,398
EARTH-BORING APPARATUS
Filed Aug. 15, 1956  6 Sheets-Sheet 2

INVENTOR.
HERMAN J. TROCHE
BY
Bates, Teare + McBean
ATTORNEYS

Nov. 8, 1960

H. J. TROCHE 2,959,398

EARTH-BORING APPARATUS

Filed Aug. 15, 1956

INVENTOR.
HERMAN J. TROCHE
BY
*Bates, Teare + McBeau*
ATTORNEYS

Nov. 8, 1960 H. J. TROCHE 2,959,398
EARTH-BORING APPARATUS
Filed Aug. 15, 1956 6 Sheets-Sheet 4

INVENTOR.
HERMAN J. TROCHE
BY Bates, Teare & McBean
ATTORNEYS

Nov. 8, 1960     H. J. TROCHE     2,959,398
EARTH-BORING APPARATUS

Filed Aug. 15, 1956     6 Sheets-Sheet 5

INVENTOR.
HERMAN J. TROCHE
BY
Bates, Teare & McBean
ATTORNEYS

Nov. 8, 1960 H. J. TROCHE 2,959,398
EARTH-BORING APPARATUS
Filed Aug. 15, 1956 6 Sheets-Sheet 6

INVENTOR.
HERMAN J. TROCHE
BY
Bates, Teare & McBean
ATTORNEYS

United States Patent Office 2,959,398
Patented Nov. 8, 1960

2,959,398

EARTH-BORING APPARATUS

Herman J. Troche, Fairview Park, Ohio, assignor to J. H. Holan Corporation, Cleveland, Ohio, a corporation of Ohio Filed Aug. 15, 1956, Ser. No. 604,227

6 Claims. (Cl. 255—19)

This invention relates generally to derricks and more particularly relates to an improved derrick construction including an auxiliary semi-rigid frame for feeding and guiding an earth boring apparatus.

Portable derricks are essential equipment on many types of wheeled utility vehicles and are adapted to handle various types of articles at different locations. One type of portable derrick embodies an A-type frame forming a boom which is pivotally supported for tilting movement in a vertical plane on the rear end of a utility vehicle together with hydraulic or other power means for operating the derrick. Such a derrick is usually provided with a winch and cable for lifting and carrying various types of articles on the derrick frame.

Exemplary of the application of a portable derrick of this type is its use in supporting an earth-boring apparatus for drilling holes in the ground to receive a pole or the like which is likewise adapted to be set in the hole by the derrick. However, in this type of application, when the earth-boring apparatus is merely supported by a winch and cable it obtains no aid nor mechanical advantage from the derrick frame and must rely upon external controls or otherwise serve as its own guide during the drilling operation.

Accordingly, it is a principal object of this invention to improve the derrick frame construction in a manner that will positively feed and guide an earth-boring apparatus throughout the boring operation.

It is a further object of this invention to provide an auxiliary frame for supporting an earth-boring apparatus on a derrick in a manner that will permit the derrick to be applied to an alternate operation without requiring the removal of the earth-boring apparatus.

Another object of this invention relates to an improved frame construction for a power driven derrick which will positively apply the derrick force to feed an earth-boring apparatus supported thereby and at the same time guide the earth-boring apparatus throughout the boring operation.

Briefly, the foregoing and other advantages and objects are obtained in accordance with this invention by providing a semi-rigid auxiliary frame for a power operated portable derrick which is sufficiently rigid to apply the operating force of the derrick to an earth-boring apparatus carried by the auxiliary frame and yet flexible enough to guide the earth-boring apparatus accurately throughout the earth-boring operation irrespective of the position of the derrick. Provision is made for quick dismantling of the auxiliary frame to permit the application of the derrick to other uses or for storage in an inactive position on top of the supporting vehicle. The auxiliary frame is mounted on the derrick frame in such manner that the derrick may be alternately applied to different uses without removing or otherwise completely dismantling the earth-boring apparatus. Provision is also made on the derrick frame for receiving and storing the earth-boring apparatus in an inactive position when the derrick is stored on top of the vehicle.

In the drawings:

Fig. 1 is a rear perspective view of a portable derrick and earth-boring apparatus operatively supported on the rear of a utility vehicle;

Fig. 2 is a fragmentary side elevation, in partial section, illustrating the earth-boring apparatus and its anchorage to the vehicle;

Figure 13:
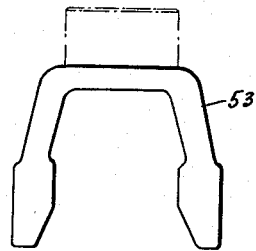
Figure 14:
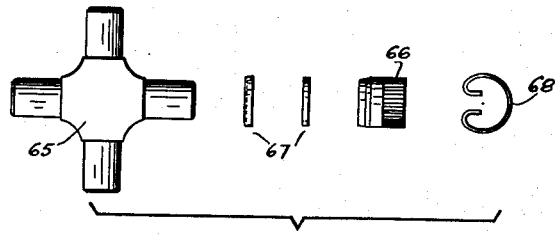
Figure 12:
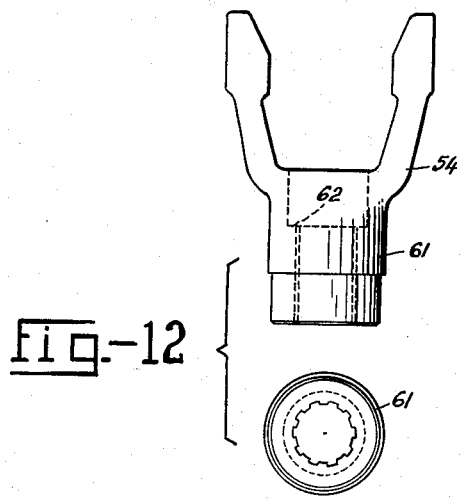

Figs. 12 and 13 respectively illustrate different forms of a universal connecting yoke; and Fig. 14 is an exploded view of the connecting members which couple the universal spindle to the yoke arms to provide a universal connection.

Referring now more particularly to Fig. 1 of the drawings, there is shown a wheeled utility vehicle having a truck body 10 which supports on the rear end thereof an A-type derrick frame having a pair of legs 12 and 13 connected together at one extremity to form a boom with each leg having its other end pivotally mounted on either side of the rear end of the truck body. Hydraulically operated pistons 15 are coupled to the pivoted extremity of each leg of the derrick in a manner to positively tilt the derrick boom vertically for storage on the top of the truck body. The derrick also has a central leg 14 extending from the joined extremities at the apex of the frame downwardly to the rear platform 11 of the truck body where the lower extremity of the central leg is removably coupled to a pivot pin 16 which is journaled in brackets 17 fixed on the platforms in vertical spaced relation from the pivotal axis of the other two legs of the frame.

Figure 5:
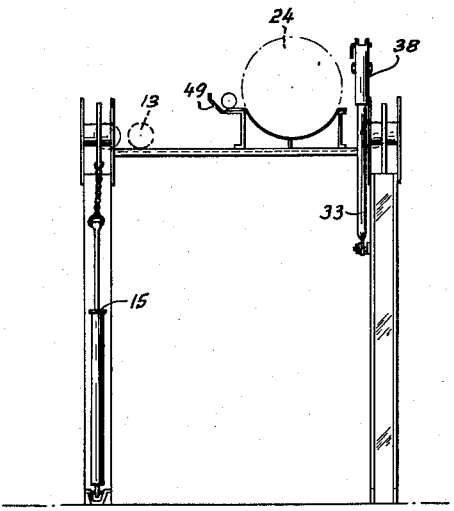
Fig. 5 is a partial rear end view of a portion of the derrick frame stored on top of the vehicle body and illustrating another portion of the integral rack for supporting the earth-boring apparatus in stored position thereon as well as the power driven coupling for tilting the derrick frame in a vertical plane.
Figure 7:
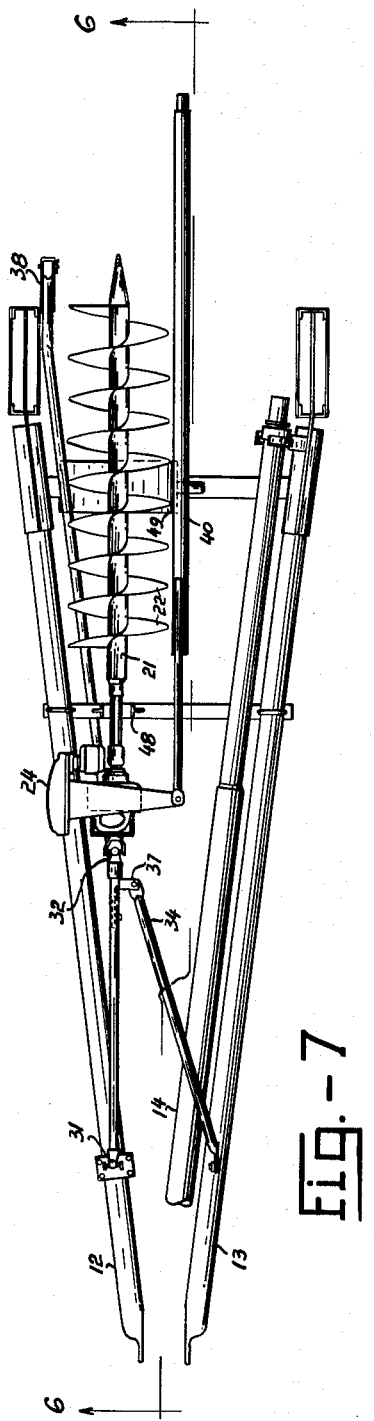
Figs. 6 and 7 illustrate respectively the side elevation and top plan views of the derrick frame and earth-boring apparatus when stored on top of the vehicle body.

The central leg 14 is extensible and preferably has an upper tubular portion 18 which telescopically receives the lower portion 19. A suitable double-acting piston is operably disposed in the central leg to extend or retract the central leg in response to the selective application of hydraulic pressure and coacts with the hydraulic pistons 15 to selectively tilt the derrick frame and load in a vertical plane. Hydraulic fluid under pressure may be selectively supplied in a controlled manner through conduits from a suitable source of pressure not forming a part of this invention and therefore not shown. It will be seen therefore that hydraulic motor units 15 (as best shown in Fig. 5) may be used for swinging the boom in a generally vertical plane, and from a storage position overlying the vehicle, and as shown in Fig. 7, to a generally vertical position, whereupon the extensible and detachable motor unit 14 may be attached as at 16 to brackets 17 on the vehicle body, to take over for the balance of the movement of the boom to operative or working position, as shown in Fig. 1. Thus motor unit 14 is used to move the boom when the latter is in its operative position, and therefore apply the force of the boom to earth boring apparatus 20. The aforementioned motor unit arrangement 15 is known in the art and forms no particularly novel part of the instant invention.

An earth-boring apparatus 20 is removably suspended from the derrick boom and includes a rotatable drill shaft 21 having a spiral blade 22 for drilling a hole in the ground. The drill shaft 21 is drivingly coupled to a mechanical or hydraulic motor which is carried by a suitable head 24 that can be selectively activated to rotate the spiral blade 22. For exemplary purposes, a hydraulic-type motor is illustrated in the drawings and suitable conduit connections 26 are shown extending rearwardly from the head 24 to the truck body 10 where they may be connected to the controlled source of hydraulic fluid.

The apex of the derrick frame is provided with a conventional sheave and guide pulley arrangement 27 together with suitable rollers 28 for guiding a winch driven cable to suspend various types of articles therefrom. It will be readily apparent that if the earth-boring apparatus illustrated were suspended by a winch operated cable in this manner, the derrick would not aid in any manner in the boring operation. Furthermore, the free suspension would be unstable and would require external control means for guiding the boring drive shaft 21 downwardly in a straight line. However, in accordance with this invention, the boring apparatus is supported on the derrick by a semi-rigid auxiliary frame (Figs. 1 and 3) which is sufficiently rigid in the tilting plane to positively apply the power operated derrick force to the drill shaft 21 and thereby aid the shaft in its boring operation. At the same time, the auxiliary frame is sufficiently flexible to eliminate much of the radial travel produced by the derrick as it moves downwardly, thereby steering and guiding the boring drill shaft 21 in a more nearly straight line. The term "semi-rigid" is employed to describe a plurality of rigid elements which are interconnected for relative movement in a manner to provide some flexibility in the resultant frame assembly.

The semi-rigid auxiliary frame includes a main supporting rod 30 that may be a light weight tubular rod which has a universal connection 31 at one end to the leg 12 adjacent the apex A-frame and also has a universal connection 32 to a coupling on the head 24 of the earth-boring apparatus. The auxiliary frame also has a bracing rod 34 which has one extremity pivotally connected through a suitable clamp 36 to the leg 13 of the A-frame and has its other extremity pivotally connected to a bracket 37 extending outwardly from the lower extremity of the main supporting rod 30. The two rods 30 and 34 coact between the main derrick frame and the earth-boring apparatus to provide a substantially rigid connection which transmits the downward power-operated force of the derrick frame to the drill shaft 21 of the boring apparatus and thereby assists in the boring apparatus.

The auxiliary frame is also provided with a radius rod 38 having one end pivotally connected to a rearwardly extending bracket 39 on the main supporting rod 30 and having its rearward extremity pivotally connected to the free end of a shorter rod 33 the other end of which is pivotally connected to the right hand side of the truck body. The radius rod 38 coacts with the other two rods 30 and 34 to provide a semi-rigid force transmitting auxiliary frame for the derrick.

The head 24 of the earth-boring apparatus is anchored through an extensible rod 40 to the rear platform of the truck body as best shown in Figs. 1 and 2 of the drawings. The extensible rod 40 has a lower portion 41 which is pivotally connected to a bracket 42 on the truck body and which telescopically extends into a cylindrical sleeve portion 44 at the upper end of the rod. The sleeve portion 44 terminates in an abutment 45 to provide a stop for limiting the extent of rod retraction. A pair of arms 46 and 47 diverge outwardly from the upper end of the extensible rod 40 and the extremity of each arm has an aperture adapted to receive a pivot pin for engagement with the adjacent end of the head 24. The extensible rod 40 restricts rotation of the head 24 and at the same time coacts with the auxiliary frame to guide the drive shaft 21 during the boring operation.

Figure 4:
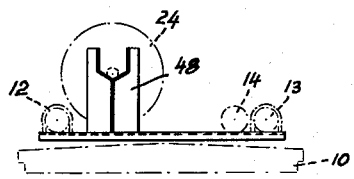
Fig. 4 is a partial front end view of a portion of the derrick frame in stored position on top of the vehicle body and illustrating the disposition of an integral rack for supporting the earth-boring apparatus in stored position thereon.
Figure 3:
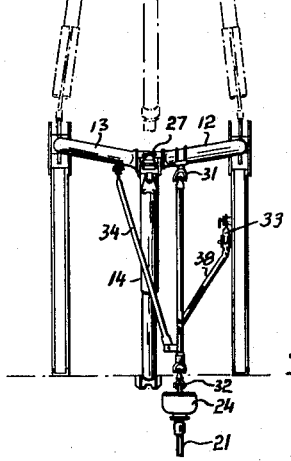
Fig. 3 is a partial rear end view of the vehicle and derrick assembly illustrating the disposition of the auxiliary frame for supporting the earth-boring apparatus in a selected horizontal and dotted vertical position respectively.
Figure 6:
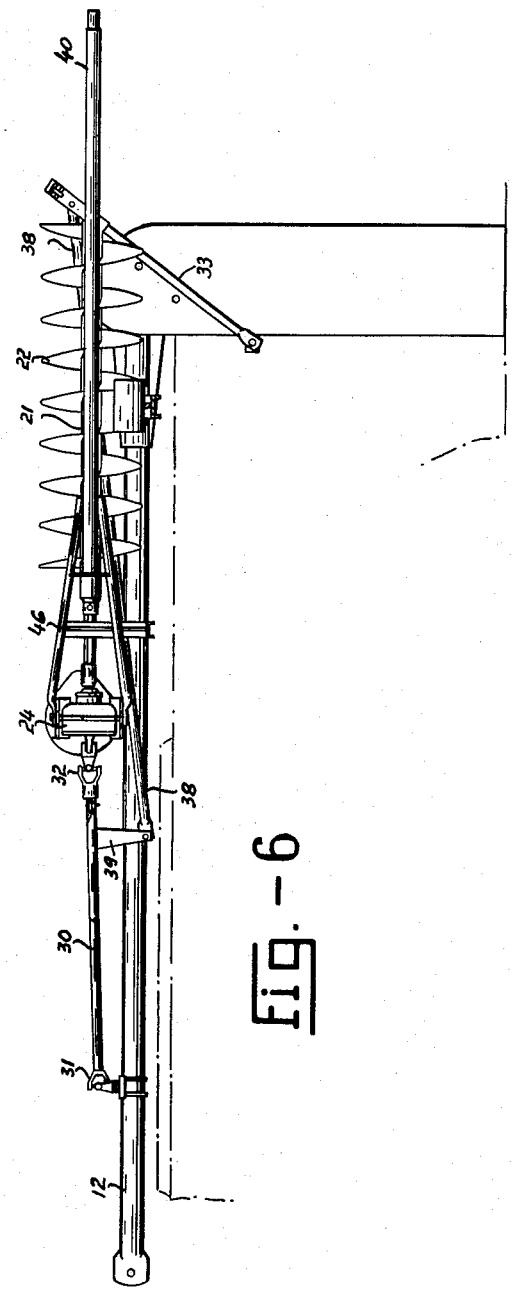

Referring now to Fig. 3 in conjunction with Fig. 1 of the drawings, it is seen that the free suspension of the earth boring apparatus from the main supporting rod 30 displaces the boring apparatus to the right of the apex of the derrick when viewed from the rear end of the vehicle. Furthermore, the upper extremities of the main supporting and bracing rods 30 and 34 are connected to the respective legs 12 and 13 of the A-frame at a point spaced rearwardly from the apex of the derrick frame. Thus, the earth-boring apparatus is suspended in a non-interfering position relative to the path of the winch operated cable. The pivotal connections between the main supporting rod brackets and the rearwardly and sidewardly extending bracing rods are preferably accomplished through quick release pins to permit partial dismantling of the auxiliary frame. Thus, when the radius rod 38 is disconnected, the boring apparatus can be swung inwardly when the derrick is raised to suspend a pole for setting into the hole bored by the earth-boring apparatus. Furthermore, when both the radius rod 38 and the anchoring rod 40 are disconnected, the entire derrick frame, together with the boring apparatus, can be swung over into stored position on top of the vehicle body as best shown in Figs. 6 and 7 of the drawings. For this reason, the A-frame of the derrick carries longitudinally spaced integral racks 48 and 49 which form a cradle support for the drill shaft 21 when the derrick and boring apparatus are rotated into the stored position. The manner in which the boring apparatus is adapted to be disposed in the supporting racks on the derrick frame is diagrammatically illustrated by the dotted lines in the respective end views of Figs. 4 and 5 of the drawings. All parts of the derrick frame, including the auxiliary frame, the anchoring bar and the earth-boring apparatus are compactly stored on the roof of the truck body; the only portion left free is an extended rear extremity of the radius rod 38 which is left hanging freely from an intermediate connection so that its rearward extremity can be anchored to a bracket on the corresponding side of the truck body.

Figure 8:
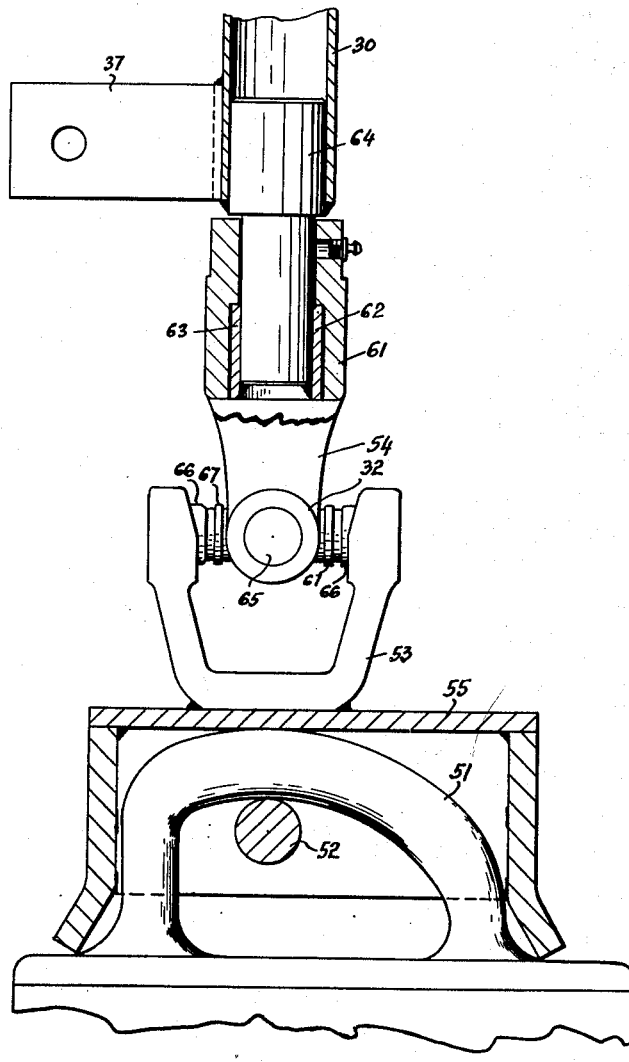
Fig. 8 is a partial sectional view illustrating the coupling and universal connection between the earth-boring apparatus and the supporting auxiliary frame.
Figure 9:
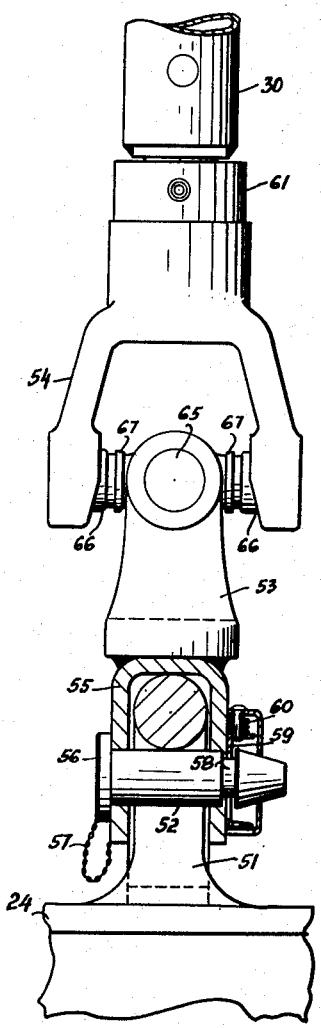
Fig. 9 is a partial sectional end-wise view of the coupling and connection of Fig. 8 and illustrates in greater detail the quick release feature of the coupling.
Figure 11:
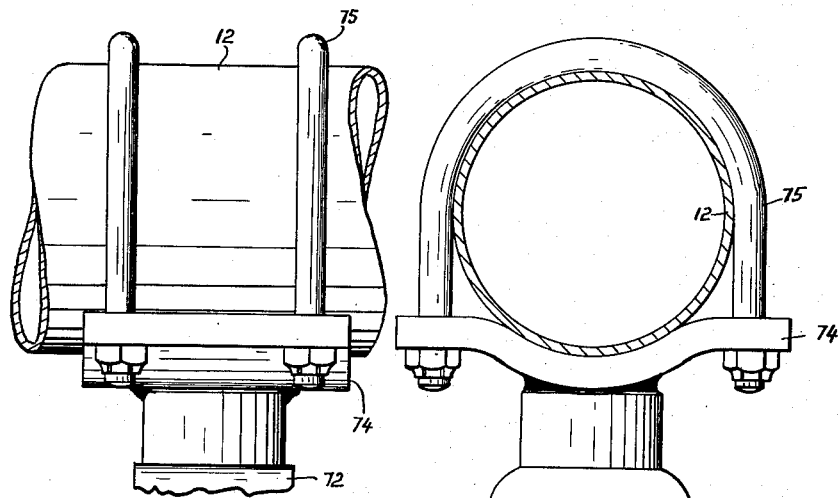
Fig. 10 and 11 are enlarged partial sectional views of a universal connection between the auxiliary frame and the derrick frame.
Figure 10:
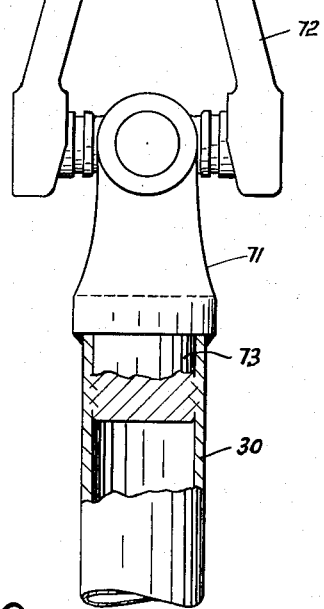

Referring now more particularly to Figs. 8 and 9 of the drawings, there is shown an enlargement, in partial section, of the coupling between the head 24 and the universal connection 22 to the main supporting rod 30. The head 24 has a looped handle 51 on its top which is adapted to be engaged by a releasable pin 52 in a manner which will be hereinafter more fully described. The universal connection 22 includes a pair of yokes 53 and 54, each having axially aligned cylindrical apertures extending through the irrespective arms. The lower yoke 53 has its apex welded or otherwise securely connected to a channel-shaped shroud 55 which extends over the handle 51 and which carries the releasable pin 52 (Fig. 9). The pin 52 extends through the loop in the handle 51 and supports the boring apparatus on the lower yoke 53. The pin 52 also has a head 56 which carries a chain 57 that is anchored to one side of the shroud and has an annular groove 58 intermediate its ends which is adapted to be engaged by the walls of an aperture in a spring-pressed locking plate 59. The locking plate has a flanged extremity that can be depressed by an operator's finger and, when the plate is depressed against the spring-bias 60, it will release the pin 52 for withdrawal. This locking-pin arrangement provides a quick release for the boring apparatus from the supporting auxiliary frame for the purposes hereinafter described.

The upper yoke 54 has an integral tubular portion 61 extending from its apex which is adapted to rotatably receive a spindle 64 that is welded or otherwise securely fixed in a hollow extremity of the main supporting rod 30. The interior surface of the tubular portion 61 is splined at one end (Fig. 15) and has an enlarged diameter at the other end forming an integral shoulder 62 adapted to seat on the sleeve 63 which is inserted and welded to the spindle 64 at assembly. Thus, the entire earth-boring apparatus may be rotated freely on the spindle 64 and may be tilted in transverse vertical planes about the aligned apertures in each of the yoke arms when the yokes are coupled together to form a universal connection. The coupling is accomplished through a compound spindle member 65 having four spindles displaced 90° from each other; the aligned pairs of spindles being adapted to seat in the corresponding yoke by providing suitable bushing 66 and interlocking annular members 67 which are inserted from the exterior end of each yoke aperture and held in place by means of a spring clip 68. The assembly on one spindle portion is shown in exploded view in Fig. 14 of the drawings.

The universal connection between the upper extremity of the supporting rod 30 and leg 12 of the derrick frame is accomplished through similar interconnection between the arms of a pair of yokes 71 and 72, one of which carries an integral spindle 73 of reduced diameter extending from its apex and welded or otherwise secured into the upper tubular extremity of the main supporting rod and the other of which has an integral spindle portion extending from its apex and welded to the clamping plate 74 of a U-bolt clamp 75 which encircles leg 12 of the derrick frame. Thus, the main supporting rod 30 is capable of tilting movement in transverse vertical planes relative to the derrick frame.

I have provided an improved construction for a portable derrick adapted to be tiltably supported on the rear of a wheeled utility vehicle to operate on earth-boring apparatus and to alternately support miscellaneous other articles without requiring removal of the boring apparatus therefrom. The improved derrick includes a self-contained rack for supporting the boring apparatus in stored position on top of the truck body and has power-operated means for driving the derrick downwardly. The improved construction also includes a semi-rigid auxiliary frame for supporting and guiding the earth-boring apparatus during its drilling operation; the frame being sufficiently rigid to apply the downward operating force from the derrick to the drilling shaft and thereby aid in the boring operation and yet being sufficiently flexible to eliminate the radial travel produced by the arcuate path of the derrick to steer and guide the drill shaft in a straight line. The positive derrick feed thus eliminates the necessity for an auxiliary gear box for rapid reverse of a winch, since the earth-boring apparatus is fed both into and out of the ground by the derrick instead of a winch. The auxiliary frame includes universal connections between the derrick and the earth-boring apparatus to permit relative movement therebetween without disturbing the rigidity of the frame essential to the application of the derrick force thereto and includes quick release pivot pin connections between various members thereof to permit partial or total disassembly for alternate application of the derrick to other purposes or for storage on top of the vehicle body, otherwise it would be necessary to detach the boring apparatus each time a pole was being set and for transport.

I have shown and described what I consider to be preferred embodiments of my invention, and it will be obvious to those skilled in the art that other changes and modifications may be made without departing from the scope of my invention as defined in the appended claims.

I claim:

1. In a portable derrick including a boom pivotally mounted at one end on a support for tilting movement in a generally vertical plane and from forward storage position to rearward load supporting position, the combination therewith of a frame for operatively supporting an earth boring tool comprising, a rigid main rod movably connected at one end thereof to said boom and depending therefrom, a bracing rod having one end pivotally connected to the boom in laterally spaced relation to the boom connected end of said main rod and having its other end connected to the depending end of said main rod, to restrict relative movement of said main rod in a generally vertical plane extending substantially transverse of the tilting plane of said boom, a bracket member disposed above the connection of said main rod to said bracing rod and being secured at one end thereof to one of said rods, said bracket member extending inwardly away from said rods and in the general direction of extension of said boom, another bracing member having one of its ends pivotally connected to said support below the pivotal connection of said boom to said support, the other end of said bracing member being pivotally connected to said bracket member outwardly therealong from the connection of said bracket member to said one rod, said bracing member being operative to restrict relative movement of said main rod in the tilting plane of said boom, and means for freely supporting the earth boring tool from the depending extremity of said main rod, said frame being sufficiently rigid in the tilting plane of said boom to positively apply the downward force of said boom to the tool, said bracing member being of a predetermined length with respect to the distance between the connections of said rods to said boom and the connection of said boom to said support, and said frame being sufficiently flexible due to the movable connections of said rods to said boom and the movable connections of said bracing member to said support and to said bracket member, so as to maintain the axis of the path of movement of the boring tool substantially vertical throughout the earth boring operation.

2. In a portable derrick including a boom pivotally mounted at one end on a support for tilting movement in a generally vertical plane and from forward storage position to rearward load supporting position, the combination therewith of a frame for operatively supporting an earth boring tool comprising, a rigid main rod movably connected at one end to and depending freely from said boom, a rigid bracing rod having one end pivotally connected to the boom in laterally spaced relation to the boom connected end of said main rod and having its other end pivotally connected to the depending end of said main rod to restrict relative movement of said main rod in a generally vertical plane extending substantially transverse of the tilting plane of said boom, a rigid generally elongated bracket member disposed above the pivotal connection of said main rod to said bracing rod and being secured at one end thereof to said main rod, said bracket member extending inwardly away from said rods and in the general direction of extension of said boom, a second bracing rod having one of its ends pivotally connected to said support below the pivotal connection of said boom to said support, the other end of said second bracing rod being pivotally connected to said bracket member adjacent the free end of said bracket member, said second bracing rod being operative to restrict relative movement of said main rod in the tilting plane of said boom, an earth boring tool having a head and a rotatable drill shaft, removably coupled to the depending extremity of said main rod, said earth boring tool depending freely from said main rod, and a third telescopic type bracing rod having its ends respectively pivotally connected to said support and to said head of said earth boring tool and adapted to restrain rotation of said head about its vertical axis, said frame being sufficiently rigid in the tilting plane of said boom to positively apply the downward force of the boom to said tool, said second bracing rod being of a predetermined length with respect to the distance between the connections of said main rod and the first mentioned bracing rod to the boom and the connection of said boom to said support, and said frame being sufficiently flexible due to the movable connections of said main and said first bracing rods to said boom and the pivotal connections of said second bracing rod to said bracket member and to said support, so as to maintain the axis of the path of movement of said tool substantially vertical throughout the earth boring operation.

3. In a portable derrick in accordance with claim 1 including means for providing for quick separation of said bracing member and said bracket member to permit partial dismantling of said frame for use of said derrick without interference from the earth boring tool.

4. In a portable derrick in accordance with claim 2 wherein said boom includes integral bracket means spaced along its length for receiving and storing said earth boring tool when said boom is in said storage position on said support.

5. In a portable derrick in accordance with claim 2 wherein said main rod is offset to one side of the boom's free extremity to permit said boom extremity to support an additional article without interference from the earth boring tool.

6. In a portable derrick including a boom pivotally mounted at one end on a support for tilting movement in a generaly vertical plane and from forward storage position to rearward load supporting position, the combination therewith of a frame for operatively supporting an earth boring tool comprising, a rigid main rod movably connected at one end thereof to said boom and depending therefrom, a bracing rod having one end pivotally connected to the boom in laterally spaced relation to the boom connected end of said main rod and having its other end connected to the depending end of said main rod, to restrict relative movement of said main rod in a generally vertical plane extending substantially transverse of the tilting plane of said boom, a bracket member disposed above the connection of said main rod to said bracing rod and being secured at one end thereof to one of said rods, said bracket member extending inwardly away from said rods and in the general direction of extension of said boom, another bracing member having one of its ends pivotally connected to said support below the pivotal connection of said boom to said support, the other end of said bracing member being pivotally connected to said bracket member outwardly therealong from the connection of said bracket member to said one rod, said bracing member being operative to restrict relative movement of said main rod in the tilting plane of said boom, means for freely supporting the earth boring tool from the depending extremity of said main rod, and a reciprocal type motor unit pivotally connected at one end to the free extremity of said boom and at the other end thereof being detachably connected to the support, said motor unit being operative to move the boom in its tilting plane in the load supporting position of said boom, said frame being sufficiently rigid in the tilting plane of said boom to positively apply the downward force of said boom to the tool, said bracing member being of a predetermined length with respect to the distance between the connections of said rods to said boom and the connection of said boom to said support, and said frame being sufficiently flexible due to the movable connections of said rods to said boom and the movable connections of said bracing member to said support and to said bracket member, so as to maintain the axis of the path of movement of the boring tool substantially vertical throughout the earth boring operation.

References Cited in the file of this patent

UNITED STATES PATENTS

| | | |
|---|---|---|
| 602,724 | Butler | Apr. 19, 1898 |
| 779,903 | Bocorselski | Jan. 10, 1905 |
| 1,050,361 | Halle | Jan. 14, 1913 |
| 1,622,704 | Coil | Mar. 29, 1927 |
| 2,036,978 | Anderson | Apr. 7, 1936 |
| 2,364,288 | Haggerty | Dec. 5, 1944 |
| 2,414,072 | Taft | Jan. 7, 1947 |
| 2,490,471 | Ragoss | Dec. 6, 1949 |
| 2,508,606 | Hatch et al. | May 23, 1950 |
| 2,645,458 | Yost | July 14, 1953 |
| 2,687,808 | Balogh | Aug. 31, 1954 |
| 2,703,222 | Feucht | Mar. 1, 1955 |
| 2,783,626 | Klomp | Mar. 5, 1957 |
| 2,812,162 | Lay | Nov. 5, 1957 |